(No Model.)
A. GLEASON.
TIME CHART.
No. 497,917.  Patented May 23, 1893.
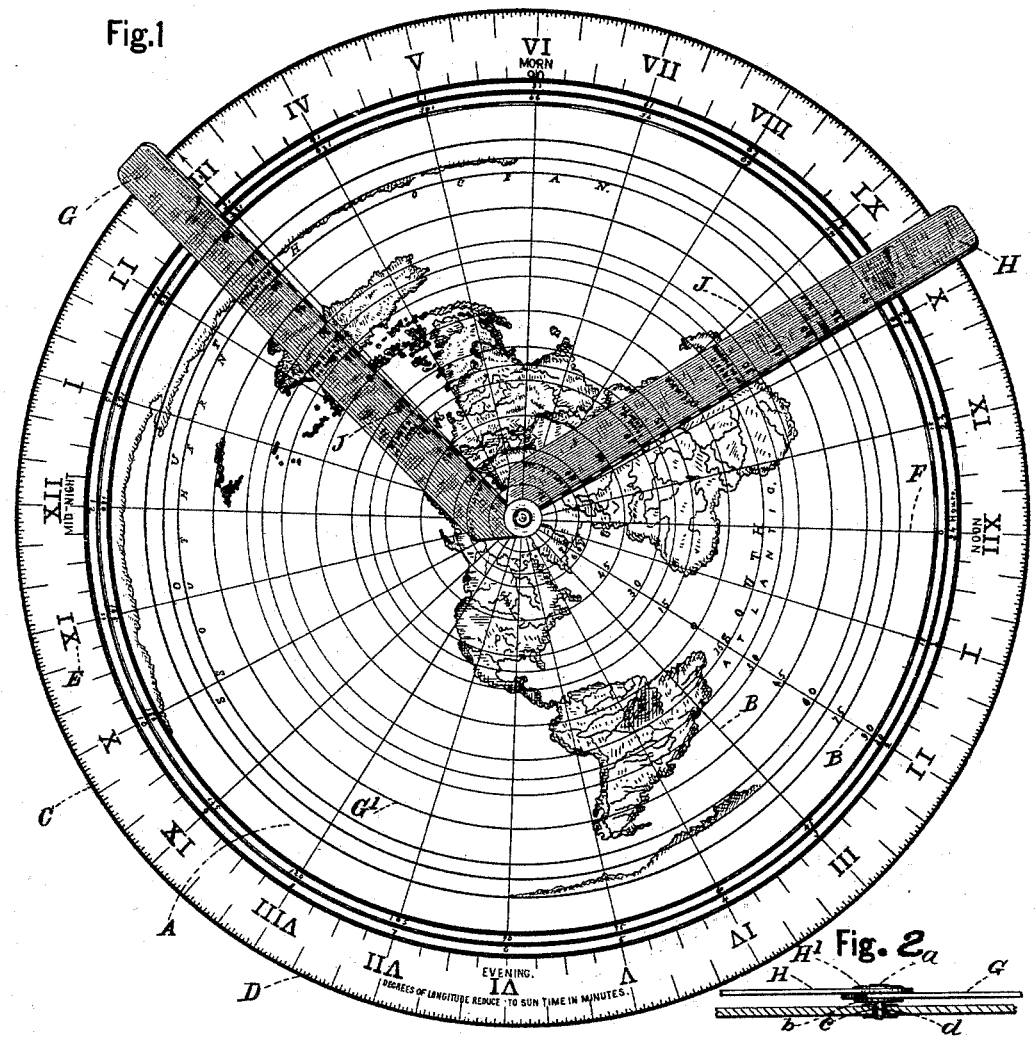
Witnesses,
Jennie M. Caldwell.
Henry C. Ashbery
Alexander Gleason, Inventor.
By James Sangster, Attorney.

UNITED STATES PATENT OFFICE.

ALEXANDER GLEASON, OF BUFFALO, NEW YORK, ASSIGNOR TO THE BUF-
FALO ELECTROTYPE AND ENGRAVING COMPANY, OF SAME PLACE.

TIME-CHART.

SPECIFICATION forming part of Letters Patent No. 497,917, dated May 23, 1893.

Application filed August 15, 1892. Serial No. 443,074. (No model.)

*To all whom it may concern:*

Be it known that I, ALEXANDER GLEASON, a citizen of the United States, residing at Buffalo, in the county of Erie and State of New York, have invented a new and Improved Time-Chart, of which the following is a specification.

My invention has reference to certain mechanical devices and geographical illustrations, to be used on a flat circular map of the world, and will be fully and clearly hereinafter described and claimed, reference being had to the accompanying drawings, in which—

Figure 1 represents a flat circular map of the world, showing the outlines of the several continents, some of the larger islands, the indicating arms and other matter which will be more clearly hereinafter shown. Fig. 2 is a vertical central sectional elevation through a small central portion of the map, showing a portion of the indicating arms and the construction of the parts by which they are secured movably together and the two to the map.

Referring to said drawings—A represents the map proper which is circular in form, and flat; having twenty four radiating or meridian lines, B, extending from the center to the circumference. The periphery, C, of the circle being divided into divisions, D, which represent the minutes in twenty four hours; (for this purpose it would take fourteen hundred and forty of these divisions,) I have shown but half of this number in the drawings because the whole number would bring the lines too near together for showing them clearly. The twenty four meridian lines are divided near the periphery into quarters each representing quarters of an hour and at the periphery into sixty divisions each representing minutes of meridian time. A little way in from the periphery and at the twenty four hour divisions, are shown the hours of the day in Roman numerals, indicated by the letter, E, and commencing the reckoning of time from Greenwich, London, or on the line F.

On the face of the map proper, and within another circle (still toward the center) is laid out the continents, principal islands, rivers and cities of the world; their latitudes and longitudes corresponding to the latitudes and longitudes of all other first class geographical globe maps or charts of the world.

On the face of the map are circular lines from the center or north pole to ninety degrees south representing the latitudes of the earth, both north and south of the equator. These circular lines are indicated by the letter, G'.

In operating with this map I employ two indicating arms G and H, pivoted together by means of a pin, a, having a flange, b, (see Fig. 3), the two arms G and H being put on said pin above the flange, b, then a light spring washer H', in the top of the arm H and the head of the pin riveted so that the two arms are held together by friction and can be turned on each other back and forth.

In the center of the map is an eyelet, c, and into the opening (through the eyelet, c), is put the lower end, d, of the pin, a, so that these indicating arms have two movements, a movement one on the other and one or both together around the center of the map, and may be detached at pleasure from the map if so desired, and are also made easily removable by simply lifting the pin, d, out of the eyelet c. On these indicating arms are numerals, J, indicating degrees of latitude corresponding to the degrees of latitude as represented and marked on the map at B at thirty degrees west of Greenwich. By bringing either of the indicator arms to any given point, the latitude and longitude of the said point may at once be determined without future computation.

In order to ascertain the time of day or night, in any part of the world, corresponding to your own meridian time; first: place the lower indicating arm, G, into the center socket or receptacle, letting the graduate edge of the arm be in line on your own meridian time, for instance if it be New York, which is the fifteenth meridian: Now you wish London's corresponding time:—Place the arm H, on the meridian of Greenwich, which is London, and marked, F, at the same time holding the arm G in its place. You have now got the absolute corresponding difference of time between New York and London, which is five hours in round numbers. Next look at your own pocket time or clock, and if it be just eleven o'clock; move the arm G to eleven and the arm H, will still retain its relative position to arm G, (as the two arms are held to each other by friction) and indicate six p. m. or the corresponding fractional parts of an hour be it more or less. Thus the time stands all ready computed to any child who is able to read the time of day from the face of an ordinary clock. Again, in order to give the child the most simple lesson first I would get the difference of the time between the two places as above mentioned, then placing the arm G at twelve, of course the arm H will stand at five p. m. for London, and there is no computation or counting for the child to make; he thus reads the hour and fractional part thereof from the dial of the map. The utility of such a computating map will be obvious, not only to the school child but for an adult or official person. The map is not so extorted as to lose the relative latitude and longitude of any places on the land or sea, but retains all latitudes and longitudes of places agreeing with other recognized authors; and as the proper relations of continents and countries all stand in their relative position to each other, they are thus impressed upon the mind of the student. The extorsion of the map from that of a globe consists, mainly in the straightening out of the meridian lines allowing each to retain their original value from Greenwich, the equator to the two poles.

I claim as my invention—

The combination with a time chart of a circular time dial encompassing the circular map, a disk or dial graduated and divided to indicate longitude and sun time on any meridian line or intervening lines, two indicating arms loosely pivoted to the center of the circular map, numerals indicating degrees of longitude on each of said arms, and a pivoted joint for holding said arms together so the friction between them will be sufficient to hold them one to the other at any point to which one may be moved on the other and permit both to be moved together by turning one, substantially as and for the purposes described.

ALEXANDER GLEASON.

Witnesses:
JAMES SANGSTER,
JENNIE M. CALDWELL.